C. MUEHLEISEN.
CLUTCH MECHANISM.
APPLICATION FILED JAN. 23, 1911.
992,033.
Patented May 9, 1911.
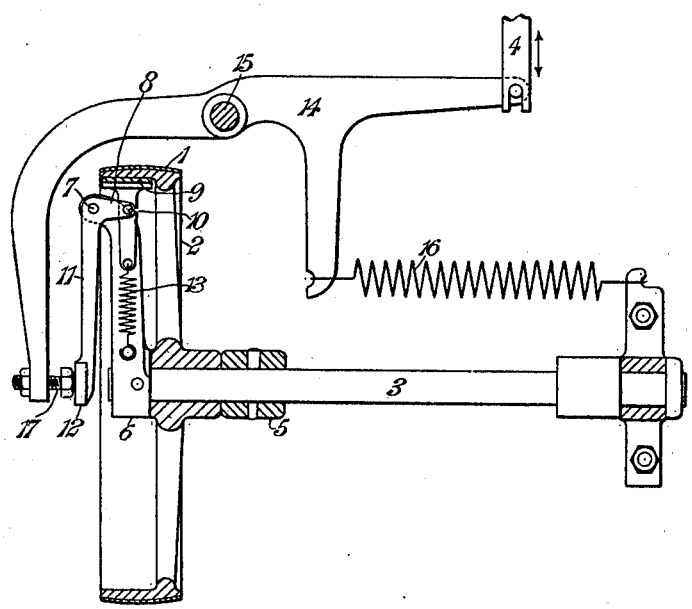
Witnesses
Inventor
Carl Muehleisen
per         Attorney

UNITED STATES PATENT OFFICE.

CARL MUEHLEISEN, OF BERLIN, GERMANY, ASSIGNOR TO MERGENTHALER LINOTYPE COMPANY, A CORPORATION OF NEW YORK.

CLUTCH MECHANISM.

992,033.        Specification of Letters Patent.        Patented May 9, 1911.

Application filed January 23, 1911. Serial No. 604,049.

*To all whom it may concern:*

Be it known that I, CARL MUEHLEISEN, a citizen of the United States of America, residing at 88 Chausseestrasse, Berlin, N. 4, in the Empire of Germany, have invented new and useful Improvements in Clutch Mechanism, of which the following is a specification.

The present invention consists of improvements in the driving clutch of the line-casting machine known commercially under the trade mark "Linotype" the accompanying figure being a plan of the preferred constructional form thereof.

Referring to this figure, 1 is the driving band and 2, the driving pulley loose on the main shaft 3, and 4, the clutch controlling bar. The pulley 2 is prevented from moving along the shaft 3 by a collar 5 fast thereon, on one side, and one or more arms 6 fast on the same shaft, on the other. The outer end of each arm 6 has a bell-crank lever fulcrumed on it at 7. One arm, 8, of each lever has one of the clutch blocks 9 pivotally connected to it at 10, while the other arm, 11, extends toward the shaft 3 where it has connected with it a disk 12. This latter has its center alined, or nearly so, with the axis of the shaft 3.

13 is a spring pulling on a clutch block 9 from a point on the arm 6 near the shaft 3, and tending to pull it away from the pulley 2 thereby holding the disk 12 at a working distance from the outer end of the shaft 3.

14 is a lever fulcrumed at 15 on the machine frame. The free end of one of its arms, stands outside and opposite the disk 12, while the free end of the other arm is loosely connected with the bar 4.

16 is a spring pulling on the lever 14 from a fixed point on the machine, and tending to connect the clutch.

17 is a set screw adjustable in the above mentioned free end of the lever 14 to regulate the length of its engagement with the disk 12. When the operator pushes the bar 4 toward the shaft 3, the set screw 17 is moved away from the disk 12 far enough to allow the spring or springs 13 to pull the clutch blocks inwardly and disconnect the clutch. When the bar 4 is moved in the opposite direction away from the said shaft, the spring 16 will act to rock lever 14 on its axis, whereby the bell crank lever will also be rocked and the clutch block 9 moved outwardly against the rim of the pulley, thereby connecting the clutch.

Having described my invention, I declare that what I claim and desire to secure by Letters Patent is:—

1. In a line-casting machine of the class described, the combination with the loose driving pulley and the clutch controlling bar, of one or more arms fast on the main shaft; a bell-crank lever fulcrumed on each arm; a clutch block connected to each lever; a spring to pull each clutch block away from the said pulley; a lever connected to the said bar and, by a device, such as a set screw, adjustable therein, to the bell-crank lever or all of the said bell-crank levers, the said device only contacting with it or them; and a spring pulling on that lever from a relatively fixed point in such a way that the movement of the said bar in one direction, allows the clutch to be opened, and in the other, allows it to be closed.

2. In combination with a shaft, a driving pulley loose thereon, a clutch block operatively connected with the shaft and movable outwardly to engage the pulley, a spring tending to pull the block inwardly, a movable controlling lever operatively engaging the clutch block and acting when moved in one direction to release said block to permit its spring to act, and a spring acting on said controlling lever and operating to move the same in the opposite direction.

3. In combination with a shaft, a driving pulley loose thereon, an arm fixed to the shaft, a lever pivoted to the arm and provided with two limbs, a clutch block connected to one of the limbs of the lever and movable outwardly to engage the pulley, a spring acting on said block and tending to disengage the same from the pulley, and means adapted to act on the other limb of the lever to engage the block with the pulley.

4. In combination with a shaft, a driving pulley loose thereon, an outwardly movable clutch block adapted to frictionally engage the pulley, a lever operatively connected with the shaft and connected also with said clutch block, said lever being extended inwardly and terminating at or about the axis of the shaft and free of the same, and means for operating on the inner end of said lever.

5. In combination with a shaft, a driving pulley loose thereon, an arm on the shaft, a lever pivoted to the arm and provided with two limbs, one of which extends inwardly and terminates at or about the axis of the shaft, a clutch block carried by the other limb of the lever, and means adapted to act on the inwardly extending limb of said lever to operate the clutch block.

6. In combination with a shaft, a driving pulley loose thereon, an arm fixed to the shaft, a bell crank lever pivoted to the arm, a clutch block carried by the bell crank lever and adapted to frictionally engage the rim of the pulley, a spring acting on the clutch block and tending to disengage the same from the pulley, a clutch operating lever adapted to engage the bell crank lever, a spring acting on said clutch operating lever and tending to engage the clutch block with the pulley, and means for moving the clutch operating lever against the pull of the spring.

In witness whereof I have hereunto set my hand in the presence of two witnesses.

CARL MUEHLEISEN.

Witnesses:
WOLDEMAR HAUPT,
HENRY HASPER.

---

Copies of this patent may be obtained for five cents each, by addressing the "Commissioner of Patents, Washington, D. C."